(12) United States Patent
Taguchi et al.

(10) Patent No.: US 12,521,961 B2
(45) Date of Patent: Jan. 13, 2026

(54) THERMAL INSULATION MATERIAL (71) Applicant: Sumitomo Riko Company Limited, Aichi (JP)

(72) Inventors: Yutaro Taguchi, Aichi (JP); Yuuki Saitou, Aichi (JP); Naoki Katayama, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 272 days.

(21) Appl. No.: 18/312,583

(22) Filed: May 4, 2023

(65) Prior Publication Data

US 2023/0302764 A1 Sep. 28, 2023

Related U.S. Application Data

(63) Continuation of application No. PCT/JP2022/019299, filed on Apr. 28, 2022.

(30) Foreign Application Priority Data

Jun. 29, 2021 (JP) .................................. 2021-107690

(51) Int. Cl.
*B32B 5/18* (2006.01)
*B32B 15/04* (2006.01)

(52) U.S. Cl.
CPC ............... *B32B 5/18* (2013.01); *B32B 15/046* (2013.01); *B32B 2266/057* (2016.11); *B32B 2266/126* (2016.11); *B32B 2305/022* (2013.01); *B32B 2305/08* (2013.01); *B32B 2307/206* (2013.01); *B32B 2307/304* (2013.01);

(Continued)

(58) Field of Classification Search
None
See application file for complete search history.

(56) References Cited

U.S. PATENT DOCUMENTS 6,420,476 B1 * 7/2002 Yamada ................. H01B 3/442
524/430
11,312,103 B2 4/2022 Oh et al.
(Continued)

FOREIGN PATENT DOCUMENTS

JP H06283216 10/1994
JP 2009299893 12/2009
(Continued)

OTHER PUBLICATIONS

Abe, I., Heat Insulating Material, Dec. 24, 2009, machine translation of JP2009-2999893 (Year: 2009).*

(Continued)

*Primary Examiner* — Chinessa T. Golden
(74) *Attorney, Agent, or Firm* — JCIPRNET (57) ABSTRACT

This thermal insulation material is provided with: thermal insulation layers, each of which has a porous structure having a skeleton that is composed of a plurality of particles connected with each other, while having pores inside and hydrophobic portions at least on the surface among the surface and the inside; and a pair of functional layers which are arranged on both sides of the thermal insulation layers in the thickness direction. The pair of functional layers have the same properties that include at least one of fire resistance and radiant heat dissipation properties.

10 Claims, 2 Drawing Sheets

(52) U.S. Cl.
CPC . *B32B 2307/3065* (2013.01); *B32B 2307/416* (2013.01); *B32B 2307/7376* (2023.05)

(56) References Cited

U.S. PATENT DOCUMENTS

| | | | |
|---|---|---|---|
| 11,476,532 | B2 | 10/2022 | Takeda |
| 2006/0286444 | A1* | 12/2006 | Nishino ............. H01M 50/489 |
| | | | 429/231.95 |
| 2009/0133347 | A1* | 5/2009 | Wadsworth ........... F16L 59/029 |
| | | | 52/406.2 |
| 2020/0215791 | A1 | 7/2020 | Oh et al. |
| 2020/0411818 | A1 | 12/2020 | Takeda |
| 2021/0013460 | A1* | 1/2021 | Ootsuki ................ B32B 27/285 |
| 2021/0114887 | A1 | 4/2021 | Oh et al. |
| 2021/0163303 | A1 | 6/2021 | Evans et al. |
| 2021/0332932 | A1 | 10/2021 | Kumagai et al. |

FOREIGN PATENT DOCUMENTS

| | | | | |
|---|---|---|---|---|
| JP | 2009299893 | A * | 12/2009 | |
| JP | 2012119675 | A * | 6/2012 | ............ F28F 13/003 |
| JP | 2018204708 | | 12/2018 | |
| JP | 2020031141 | | 2/2020 | |
| JP | 2020-527678 | | 9/2020 | |
| JP | 2020139560 | | 9/2020 | |
| JP | 2021500304 | | 1/2021 | |
| WO | 2019167612 | | 9/2019 | |
| WO | 2020175503 | | 9/2020 | |
| WO | 2020186494 | | 9/2020 | |
| WO | 2020202901 | | 10/2020 | |
| WO | WO-2020202901 | A1 * | 10/2020 | |

OTHER PUBLICATIONS

Kawaguchi, Y., Electronic Circuit, Jun. 21, 2012, machine translation of JP2012-119675 (Year: 2012).*
Tachibana, H., Heat Resistant Heat Insulating Sheet, Oct. 8, 2020, machine translation of WO2020/202901 (Year: 2020).*
"International Search Report (Form PCT/ISA/210) of PCT/JP2022/019299", mailed on Jul. 26, 2022, with English translation thereof, pp. 1-6.
"Notice of Reasons for Refusal of Japan Counterpart Application", issued on Feb. 4, 2025, with English translation thereof, p. 1-p. 6.
"Written Opinion of the International Searching Authority (Form PCT/ISA/237) of PCT/JP2022/019299", mailed on Jul. 26, 2022, with English translation thereof, pp. 1-8.
"Search Report of Europe Counterpart Application", issued on Jun. 28, 2024, pp. 1-9.
"The First Office Action of China Counterpart Application", with English translation thereof, issued on Nov. 29, 2025, pp. 1-14.

* cited by examiner

LEFT ←——→ RIGHT

FIG. 3

LEFT ←——→ RIGHT

FIG. 4

THERMAL INSULATION MATERIAL

CROSS-REFERENCE TO RELATED APPLICATION

This application is a continuation of PCT International Application No. PCT/JP2022/019299, filed on Apr. 28, 2022, which claims priority under 35 U.S.C. § 119(a) to Japanese Patent Application No. 2021-107690, filed on Jun. 29, 2021. Each of the above application(s) is hereby expressly incorporated by reference, in its entirety, into the present application.

TECHNICAL FIELD

The present disclosure relates to a thermal insulation material using a porous structure such as a silica aerogel.

BACKGROUND ART

Various thermal insulation materials have been used for the purpose of heat flow control in on-vehicle components, residential building materials, industrial equipment, and the like. In addition to high thermal insulation, various specifications are required for thermal insulation materials according to the application. For example, in a battery pack mounted on a hybrid vehicle, an electric vehicle or the like, a thermal insulation material is interposed between adjacent battery cells. As thermal insulation materials for battery packs, for example, Patent Literature 1 describes a thermal insulation material obtained by laminating fiber sheets in which a silica aerogel is supported. Silica aerogels have a pore structure having a size of about 10 to 50 nm and a skeleton that is composed of a plurality of silica fine particles connected with each other. For this reason, it has a low thermal conductivity and is useful as a constituent material for thermal insulation materials. Furthermore, Patent Literature 1 describes a configuration in which a heat dissipation material, such as a graphite sheet, with a high thermal conductivity is placed between laminated fiber sheets (paragraphs [0038] to [0040] and FIG. 7), According to this configuration, when battery cells undergo thermal runaway, heat in a thermal insulation material can be transferred to a housing of a battery pack or the like due to insulation heat dissipation material, thereby suppressing rapid temperature rise.

Thermal insulation materials for battery packs are required to have, for example, high thermal insulation, fire resistance, and electrical insulating properties in a high-temperature atmosphere. However, it cannot be said that the current thermal insulation materials have the required properties to a sufficient extent, and it is desired to further improve the properties and add new properties to these thermal insulation materials.

As a thermal insulation material to which properties other than thermal insulation are added, for example, Patent Literature 2 describes a thermal insulation material having: an aerogel sheet; a sol-impermeable coating layer placed on one surface of the sheet; and a functional layer placed on the other surface of the sheet. The sol-impermeable coating layer is a layer which prevents aerogel from being exposed on the surface of the aerogel sheet and suppresses dust generation (paragraph [0025]), Examples of functions of the functional layer include heat diffusion, insulation, sound absorption, vibration resistance, impermeability to water, and permeability to water vapor, which are properties required for electronic components (paragraphs [0032] to [0034]). According to the thermal insulation material described in Patent Literature 2, the functional layer is placed on only one surface of the aerogel sheet. For this reason, the obtained performance of the aerogel sheet changes depending on whether a heat source is placed on one surface or the other surface of the aerogel sheet. In addition, since the purpose of the functional layer in electronic components is to have a function of heat dissipation, fire resistance, radiant heat dissipation related to heat transfer at a high temperature, and the like are not exemplified.

In addition, Patent Literature 3 describes a heat transfer-type heat dissipation material having a thermal insulation laminate, an electrical insulation layer placed on one surface of the thermal insulation laminate, and a heat transfer layer placed inside the electrical insulation layer. The heat transfer-type heat dissipation material is attached to a device having a heat generation part and a heat dissipation allowing part and dissipates heat from the heat generation part to the heat dissipation permission part by moving the heat transfer layer inside the electrical insulation layer (paragraph [0014], FIG. 2). Patent Literature 3 describes, as the thermal insulation laminate, a three-layer structure including a first base material, a thermal insulation layer containing silica aerogel, and a second base material or a functional layer (paragraph [0021]). Here, it is described that, in a case where the thermal insulation laminate includes a first base material, a thermal insulation layer, and a second base material, the first base material and the second base material may be of the same type (paragraph [0040]). However, those exemplified as the first and second base materials are merely base materials such as paperboard (paragraph [0024]) and do not add desired properties such as fire resistance. By nature, the heat transfer-type heat dissipation material described in Patent Literature 3 is used by attaching the electrical insulation layer side to the device. That is, since the orientation in which the heat source is placed is fixed on one side, it is unnecessary to consider the symmetry of the thermal insulation laminate. Accordingly, the description of the first and second base materials does not suggest that there is symmetry in the properties of the thermal insulation material.

The present disclosure has been made in consideration of such circumstances, and the present disclosure provides a thermal insulation material which has at least one of fire resistance and radiant heat dissipation properties and exhibits the same properties regardless of on which side of thermal insulation layers in the thickness direction a heat source is placed.

CITATION LIST

Patent Literature

Patent Literature 1

Japanese Patent Laid-Open No. 2018-204708

Patent Literature 2

Published Japanese Translation No. 2020-527678

Patent Literature 3

Japanese Patent Laid-Open No. 2020-31141

Patent Literature 4

Published Japanese Translation No. 2021-500304

SUMMARY OF INVENTION (1) A thermal insulation material of the present disclosure is provided with: thermal insulation layers including a porous structure having a skeleton that is composed of a plurality of particles connected with each other, while having pores inside and hydrophobic portions at least on a surface among the surface and the inside; and a pair of functional layers arranged on both sides of the thermal insulation layers in the thickness direction, in which the pair of functional layers has the same properties that include at least one of fire resistance and radiant heat dissipation properties.

(2) In the configuration of (1) above, it is preferable that the pair of functional layers contain a high emissivity material with an emissivity of 0.6 or higher and have radiant heat dissipation properties.

(3) In the configuration of the (1) or (2) above, it is preferable that the pair of functional layers contain a high melting point material with a melting point of 500° C. or higher and have fire resistance.

(4) in any configuration of (1) to (3) above, it is preferable that the pair of functional layers have electrical insulation properties.

(5) In the configuration of (4) above, it is preferable that the pair of functional layers contain an electrical insulation material with a volume resistivity of $1\times10^6$ Ω·cm or higher.

(6) In any configuration of (1) to (5) above, it is preferable that the pair of functional layers have a thermal conductivity of 2.5 W/m·K or less.

(7) In any configuration of (1) to (6) above, it is preferable that the pair of functional layers contain at least one selected from mica, kaolinite, silica, talc, zirconia, and titanium oxide.

(8) In any configuration of (1) to (7) above, it is preferable that the thermal insulation layers include a first thermal insulation layer and a second thermal insulation layer laminated in a thickness direction, the thermal insulation material include a radiation reflection layer placed between the first thermal insulation layer and the second thermal insulation layer, and the pair of functional layers be arranged on a side of the first thermal insulation layer opposite to the radiation reflection layer and on a side of the second thermal insulation layer opposite to the radiation reflection layer.

(9) In the configuration of (8) above, it is preferable that the radiation reflection layer contain a low emissivity material with an emissivity of 0.2 or lower.

(10) In the configuration of (8) or (9) above, it is preferable that the radiation reflection layer be a metal foil, a metal vapor deposition film, or a metal paste dry film.

(11) In any configuration of (1) to (10) above, it is preferable that the thermal insulation layer have a thickness of 100 μm to 5,000 μm.

(12) In any configuration of (1) to (11) above, it is preferable that the thermal insulation layers further include one or more selected from a thickener and a reinforcing fiber.

(13) In any configuration of (1) to (12) above, it is preferable that the thermal insulation layers further include infrared shielding particles.

(14) In any configuration of (1) to (13) above, it is preferable that the porous structure be a silica aerogel having a skeleton that is composed of a plurality of silica fine particles connected with each other.

In the thermal insulation material of the present disclosure, functional layers having the same properties are arranged on both sides of the thermal insulation layers in the thickness direction. That is, a pair of functional layers is arranged symmetrically with the thermal insulation layers interposed there-between. Accordingly, the functional layers exhibit the same properties regardless of on which side of the thermal insulation layers in the thickness direction a heat source is placed. The functional layers have either one or both of fire resistance and radiant heat dissipation properties. If the functional layers have fire resistance, they can be used, for example, in battery packs to suppress spread of fire in a case where, for example, battery cells undergo thermal runaway. If the functional layers have radiant heat dissipation properties, thermal insulation in a high-temperature atmosphere can be improved. In the thermal insulation material of the present disclosure, in order to improve thermal insulation, attention has been paid to "radiation" which is a main factor of heat transfer in a high-temperature atmosphere among three modes (conduction, convection, and radiation) of heat transfer. "Radiation" is a phenomenon in which heat is transferred by electromagnetic waves, and the higher the temperature, the greater the radiation energy released. When the functional layers have radiant heat dissipation properties, heat released from a heat source is absorbed in a functional layer closer to the heat source, and the heat is released again from the surface on the heat source side, so that the transfer of heat to the thermal insulation layers is suppressed and the thermal insulation of the whole thermal insulation material is improved.

Incidentally, Patent Literature 4 describes a silica aerogel blanket containing an opacifying agent that blocks radiation heat. In the silica aerogel blanket, the opacifying agent is mixed with a silica aerogel as parts of the thermal insulation layers. For this reason, the function of suppressing heat transfer by conduction and convection using a silica aerogel cannot be separated from the function of blocking radiation heat using the opacifying agent, making it difficult to take optimal measures against heat. In addition, a second aerogel layer containing an opacifying agent is placed between a first aerogel layer and a third aerogel layer such that the opacifying agent is not exposed on the surface of the aerogel blanket. Since the second aerogel layer contains a silica aerogel and is a single layer as a thermal insulation layer, it is placed on the heat source side separately from the thermal insulation layers and does not perform the function of suppressing heat transfer to the thermal insulation layers.

DESCRIPTION OF EMBODIMENTS

Hereinafter, embodiments of thermal insulation materials of the present disclosure will be described.

First Embodiment

Configuration

Figure 1:
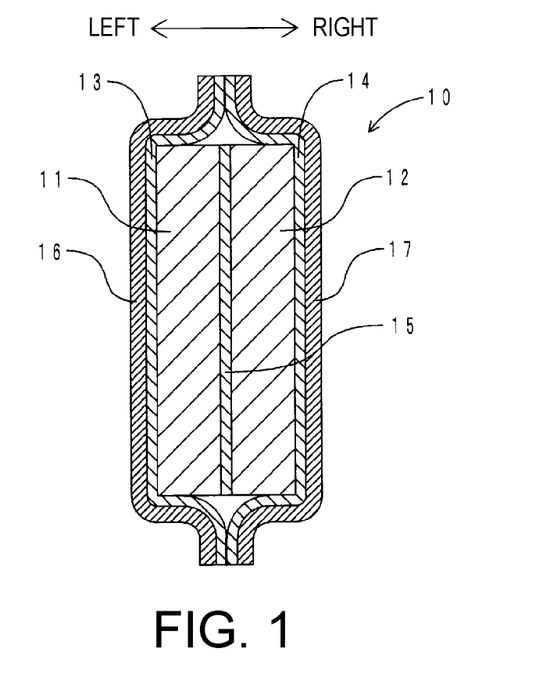
FIG. 1 is a cross-sectional view in a thickness direction of a thermal insulation material of a first embodiment.

First, a configuration of a thermal insulation material of the present embodiment will be described. FIG. 1 shows a cross-sectional view in a thickness direction of the thermal insulation material of the present embodiment. In FIG. 1, for convenience, the lamination direction (thickness direction) of members is defined as a horizontal direction. As shown in FIG. 1, a thermal insulation material 10 includes a first thermal insulation layer 11, a second thermal insulation layer 12, a first base material 13, a second base material 14, a radiation reflection layer 15, a first functional layer 16, and a second functional layer 17. The first thermal insulation layer 11, the first base material 13, and the first functional layer 16 are arranged so as to be bilaterally symmetrical with the second thermal insulation layer 12, the second base material 14, and the second functional layer 17 with the radiation reflection layer 15 interposed therebetween. The first functional layer 16 and the second functional layer 17 are arranged so as to be bilaterally symmetrical with each other with the first thermal insulation layer 11 and the second thermal insulation layer 12 interposed therebetween. Here, the first thermal insulation layer 11 and the second thermal insulation layer 12 have the same configuration, shape, and dimensions. The first base material 13 and the second base material 14 have the same configuration, shape, and dimensions. The first functional layer 16 and the second functional layer 17 have the same configuration, shape, and dimensions. Accordingly, the first thermal insulation layer 11, the first base material 13, and the first functional layer 16 will be described as representatives of the thermal insulation layers, the base materials, and the functional layers.

The first thermal insulation layer 11 has a rectangular sheet shape with a thickness of 1,000 μm. The first thermal insulation layer 11 contains: a silica aerogel; silica particles and gypsum as binders; sodium carboxymethyl cellulose (CMC) and polyethylene oxide (PEO) as thickeners; and glass fiber as a reinforcing fiber. Silica particles are nanoparticles having an average particle diameter of 12 nm. The content of silica aerogels in the first thermal insulation layer 11 is 64 mass % with respect to the entirety of the first thermal insulation layer 11 as 100 mass %.

The first base material 13 is placed on the left side of the first thermal insulation layer 11. The first base material 13 is made of glass cloth. The first base material 13 has a rectangular sheet shape with a thickness of 100 μm, and the size thereof in the surface direction is a size larger than that of the first thermal insulation layer 11. At the contact surface between the first thermal insulation layer 11 and the first base material 13, a part of the first thermal insulation layer 11 is impregnated between fibers (pores) of the first base material 13. The first base material 13 and the second base material 14 overlap each other and are fused together around the first thermal insulation layer 11 and the second thermal insulation layer 12. The first thermal insulation layer 11, the second thermal insulation layer 12, and the radiation reflection layer 15 are housed in a bag-like closed space formed by the first base material 13 and the second base material 14.

The radiation reflection layer 15 is interposed between the first thermal insulation layer 11 and the second thermal insulation layer 12. The radiation reflection layer 15 is made of aluminum foil. The radiation reflection layer 15 has a thickness of 100 μm and an emissivity of 0.04.

The first functional layer 16 is placed on the outer surface (left surface) of the first base material 13. The first functional layer 16 is placed on a side of the first thermal insulation layer 11 opposite to the radiation reflection layer 15. The first functional layer 16 has a thin film shape with a thickness of 200 μm. The first functional layer 16 contains: mica; kaolinite; ammonium polyphosphate as a flame retardant; and a urethane resin as a binder. The mica has an emissivity of 0.7, a melting point of 1250° C., a volume resistivity of $1\times10^{14}$ Ω·cm, and a thermal conductivity (perpendicular to the surface) of 0.67 W/m·K, and the kaolinite has an emissivity of 0.9, a melting point of 1100° C., a volume resistivity of $1\times10^{12}$ Ω·cm, and a thermal conductivity of 0.3 W/m·K. The first functional layer 16 has an emissivity of 0.6, an electrical resistance in the thickness direction of $1\times10^{6}$ Ω·cm, and a thermal conductivity of 2.5 W/m·K. The first functional layer 16 satisfies V-0 criterion in the UL 94 standard combustion test. In this manner, the first functional layer 16 has fire resistance, radiant heat dissipation properties, and electrical insulation properties and has relatively low thermal conductivity.

[Production Method]

First, a method for producing a thermal insulation material of the present embodiment will be described. First, water is added to colloidal silica, CMC and PEO are added thereto and stirred, and then, a silica aerogel and glass fiber are added thereto and stirred, and gypsum is further added thereto and stirred to prepare a composition for a thermal insulation layer. Similarly, water is added to a urethane resin emulsion, and mica, kaolinite, and ammonium polyphosphate are added thereto and stirred to prepare a composition for a functional layer. Next, the prepared composition for a thermal insulation layer is applied to one surface of the first base material 13 and one surface of the second base material 14 to form coated films with a thickness of 1,000 μm. Then, aluminum foil (radiation reflection layer 15) is placed on the surface of the coated film of the first base material 13, and the first base material 13 and the second base material 14 are superposed on each other so that the two coated films are laminated via the aluminum foil. Then, the obtained laminate is placed in a molding die and pressed while being heated to 150° C., Accordingly, the coated films are cured to form the first thermal insulation layer 11 and the second thermal insulation layer 12. In addition, the superposed part of the first base material 13 and the second base material 14 is fused. Finally, the prepared composition for a functional layer is applied to the other surface (outer surface) of the first base material 13 and the other surface (outer surface) of the second base material 14 and dried at a temperature of about 100° C. to form the first functional layer 16 and the second functional layer 17.

[Effect]

Next, an effect of the thermal insulation material of the present embodiment will be described. The thermal insulation layers in the thermal insulation material 10 of the present embodiment include the first thermal insulation layer 11 and the second thermal insulation layer 12 laminated in the thickness direction. A pair of functional layers (the first functional layer 16 and the second functional layer 17) with the same configuration is arranged on both sides of the thermal insulation layers (first thermal insulation layer 11 and the second thermal insulation layer 12) in the thickness direction (horizontal direction). Since the pair of functional layers 16 and 17 is symmetrically arranged with the thermal insulation layers 11 and 12 interposed therebetween, the same properties of the functional layers 16 and 17 are exhibited regardless of on which side of the thermal insulation material 10 in the horizontal direction a heat source is placed. In addition, since the thermal insulation layers 11 and 12 are coated with the functional layers 16 and 17, the first base material 13, and the second base material 14, it is effective in suppressing falling off of a silica aerogel.

The functional layers 16 and 17 contain mica and kaolinite. These are all high emissivity materials with an emissivity of 0.6 or higher, high melting point materials with a melting point of 500° C. or higher, and electrical insulation materials with a volume resistivity of $1\times10^6$ ω·cm or higher. Furthermore, the functional layers 16 and 17 also contain ammonium polyphosphate as a flame retardant. Accordingly, the functional layers 16 and 17 have fire resistance, radiant heat dissipation properties, and electrical insulation properties. Since the functional layers 16 and 17 have fire resistance, in a case where, for example, the thermal insulation material 10 is placed between battery cells of a battery pack, spread of fire due to thermal runaway of the battery cells can be suppressed, Since the functional layers 16 and 17 have radiant heat dissipation properties, heat released from a heat source is absorbed in the functional layers 16 and 17 and released again from the surface on the heat source side. Accordingly, the transfer of heat to the thermal insulation layers 11 and 12 is suppressed, and the thermal insulation of the whole thermal insulation material 10 is improved. "Radiation" is a main factor in heat transfer in a high-temperature atmosphere. Accordingly, by suppressing this, the thermal insulation is improved especially in a high-temperature atmosphere. Furthermore, since the functional layers 16 and 17 have electrical insulation properties, these are also suitable for applications such as electronic devices and battery packs which require electrical insulation properties in addition to thermal insulation. In addition, since the functional layers 16 and 17 having electrical insulation properties are arranged as the outermost layers of the thermal insulation material 10, even if there is a conductive material (the radiation reflection layer 15 made of aluminum foil) inside the thermal insulation material, conduction with the outside can be blocked. In addition, the functional layers 16 and 17 have relatively low thermal conductivity. Accordingly, it is also possible to suppress thermal conduction in the superposed part of the first base material 13 and the second base material 14 without the thermal insulation layers 11 and 12 interposed therebetween.

The thermal insulation material 10 has the radiation reflection layer 15 between the first thermal insulation layer 11 and the second thermal insulation layer 12. The radiation reflection layer 15 is made of aluminum foil. Aluminum foil is a low emissivity material with an emissivity of 0.2 or lower. Accordingly, heat that reaches from a heat source via the first functional layer 16, the first base material 13, and the first thermal insulation layer 11 or via the second functional layer 17, the second base material 14, and the second thermal insulation layer 12 is reflected by the radiation reflection layer 15. Accordingly, most of the heat released from the heat source can be blocked by the thermal insulation material 10. According to the thermal insulation material 10, the heat resistance is increased by laminating the first thermal insulation layer 11, the radiation reflection layer 15, and the second thermal insulation layer 12. Accordingly, the thermal insulation of the whole thermal insulation material 10 can be enhanced.

In the thermal insulation layers 11 and 12, silica particles and gypsum are used as binders that bind components such as silica aerogels. Accordingly, even if these are used in a high temperature atmosphere, the binders are less likely to be decomposed and deteriorate and occurrence of cracks in the thermal insulation layers 11 and 12 is suppressed, so that the thermal insulation structure can be maintained. In addition, since the thermal insulation layers 11 and 12 are relatively hard, these are less likely to be crushed even when compressed, so that the thermal insulation structure can be maintained. The thermal insulation layers 11 and 12 contain glass fiber (reinforcing fiber). Due to the action of both the glass fiber and the inorganic binder such as silica particles, the shape retainability in a high-temperature atmosphere is improved, and the thermal insulation layers are less likely to be crushed even when compressed. In addition, since the thermal insulation layers contain glass fiber, the film formability and the stability of the composition for a thermal insulation layer are improved, and falling off of silica aerogels is suppressed. The thermal insulation layers 11 and 12 contain CMC and PEO (thickeners). Accordingly, the viscosity of the composition for a thermal insulation layer increases, water suspensibility of hydrophobic silica aerogels improves, and the silica aerogels are likely to be dispersed. In addition, since flexibility is imparted, the occurrence of cracks during the production of the thermal insulation layers 11 and 12 can be suppressed.

Second Embodiment

Figure 2:
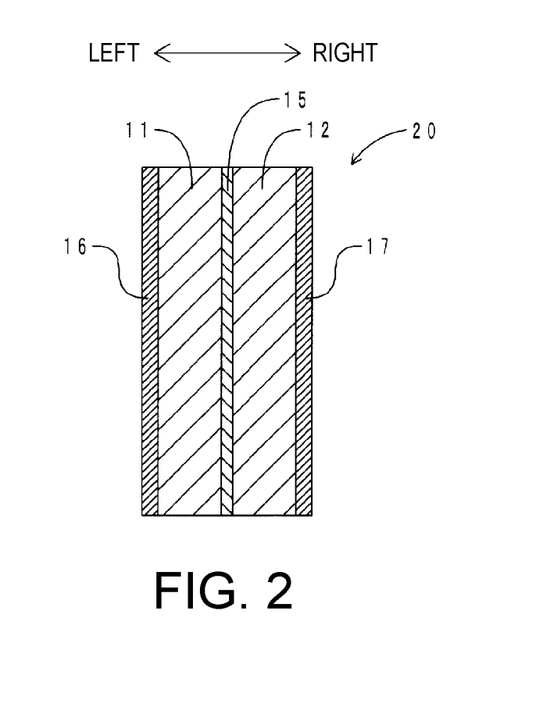
FIG. 2 is a cross-sectional view in a thickness direction of a thermal insulation material of a second embodiment.

The difference between the thermal insulation material of the present embodiment and the thermal insulation material of the first embodiment is that there is no first base material or second base material provided. Here, the difference will be mainly described. FIG. 2 shows a cross-sectional view in a thickness direction of the thermal insulation material of the present embodiment. In FIG. 2, members corresponding to FIG. 1 are denoted by the same reference numerals.

As shown in FIG. 2, a thermal insulation material 20 includes a first thermal insulation layer 11, a second thermal insulation layer 12, a radiation reflection layer 15, a first functional layer 16, and a second functional layer 17. The first thermal insulation layer 11 and the first functional layer 16 are arranged so as to be bilaterally symmetrical with the second thermal insulation layer 12 and the second functional layer 17 with the radiation reflection layer 15 interposed therebetween. The first functional layer 16 and the second functional layer 17 are arranged so as to be bilaterally symmetrical with each other with the first thermal insulation layer 11 and the second thermal insulation layer 12 interposed therebetween. The first functional layer 16 is placed on the surface (left surface) on a side of the first thermal insulation layer 11 opposite to the radiation reflection layer 15. The second functional layer 17 is placed on the surface (right surface) on a side of the second thermal insulation layer 12 opposite to the radiation reflection layer 15. The configuration and the like of each layer are the same as those of the first embodiment, so the description thereof will not be repeated.

A method for producing the thermal insulation material 20 is as follows. First, a composition for a thermal insulation layer and a composition for a functional layer are prepared in the same manner as in the first embodiment. Next, the prepared composition for a thermal insulation layer is preformed into a sheet shape with a thickness of 1,000 μm. Next, the preformed sheet-like composition for a thermal insulation layer is placed on both surfaces of aluminum foil (radiation reflection layer 15) and press-bonded, followed by drying at 150° C. Accordingly, the first thermal insulation layer 11 and the second thermal insulation layer 12 are formed on both surfaces of the radiation reflection layer 15. Then, the prepared composition for a functional layer is applied to the surfaces of the first thermal insulation layer 11 and the second thermal insulation layer 12 and dried at a temperature of about 100° C. to form the first functional layer 16 and the second functional layer 17.

Regarding the portions having the common configuration, the thermal insulation material 20 of the present embodiment has the same effect as the thermal insulation material 10 of the first embodiment. Since the thermal insulation material 20 does not require a base material, it is likely to be made thin, and costs can be reduced as much as the number of members reduced.

Third Embodiment

Figure 3:
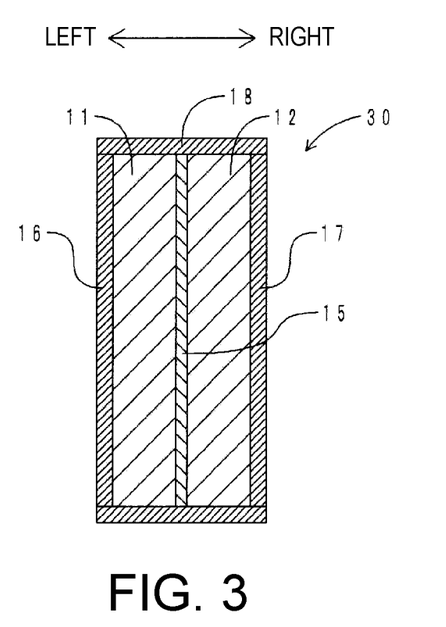
FIG. 3 is a cross-sectional view in a thickness direction of a thermal insulation material of a third embodiment.

The difference between the thermal insulation material of the present embodiment and the thermal insulation material of the second embodiment is that the functional layer is placed not only on the surfaces of the first thermal insulation layer and the second thermal insulation layer but also on end surfaces including the radiation reflection layer. Here, the difference will be mainly described. FIG. 3 shows a cross-sectional view in a thickness direction of the thermal insulation material of the present embodiment. In FIG. 3, members corresponding to FIG. 2 are denoted by the same reference numerals.

As shown in FIG. 3, a thermal insulation material 30 includes a first thermal insulation layer 11, a second thermal insulation layer 12, a radiation reflection layer 15, a first functional layer 16, a second functional layer 17, and a third functional layer 18. The first functional layer 16 and the second functional layer 17 are arranged so as to be bilaterally symmetrical with each other with the first thermal insulation layer 11 and the second thermal insulation layer 12 interposed therebetween. The first functional layer 16 is placed on the surface (left surface) on a side of the first thermal insulation layer 11 opposite to the radiation reflection layer 15. The second functional layer 17 is placed on the surface (right surface) on a side of the second thermal insulation layer 12 opposite to the radiation reflection layer 15. The third functional layer 18 is placed on four end surfaces of the first thermal insulation layer 11, the second thermal insulation layer 12, and the radiation reflection layer 15 in the thickness direction. The third functional layer 18 is formed continuously with the first functional layer 16 and the second functional layer 17 and has the same configuration and properties as those of both layers. That is, the third functional layer 18 contains mica, kaolinite, ammonium polyphosphate, and a urethane resin and has fire resistance, radiant heat dissipation properties, and electrical insulation properties. The configuration and the like of each layer other than the third functional layer 18 are the same as those of the first embodiment, so the description thereof will not be repeated. The first functional layer 16 and the second functional layer 17 are arranged on the left and right surfaces of the thermal insulation material 30, and the third functional layer 18 is placed on four end surfaces. That is, the entire outer side of the thermal insulation material 30 is coated with the functional layers 16, 17, and 18 having fire resistance, radiant heat dissipation properties, and electrical insulation properties.

A method for producing the thermal insulation material 30 is as follows. First, a composition for a thermal insulation layer and a composition for a functional layer are prepared in the same manner as in the first embodiment. Next, the first thermal insulation layer 11 and the second thermal insulation layer 12 are formed on both surfaces of the radiation reflection layer 15 in the same manner as in the second embodiment. Then, the prepared composition for a functional layer is applied to the surfaces of the first thermal insulation layer 11 and the second thermal insulation layer 12 and the four end surfaces including the radiation reflection layer 15 in the thickness direction, and dried at a temperature of about 100° C. to form the first functional layer 16, the second functional layer 17, and the third functional layer 18.

Regarding the portions having the common configuration, the thermal insulation material 30 of the present embodiment has the same effects as the thermal insulation material 10 of the first embodiment and the thermal insulation material 20 of the second embodiment. Since the entire outer side of the thermal insulation material 30 is coated with the functional layers 16, 17, and 18 having fire resistance and the like, the effect of blocking heat and flame is further enhanced and the safety is further improved.

Fourth Embodiment

Figure 4:
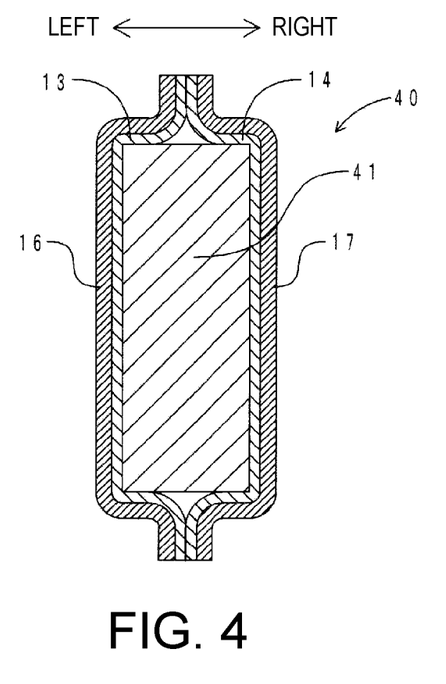
FIG. 4 is a cross-sectional view in a thickness direction of a thermal insulation material of a fourth embodiment.

The difference between the thermal insulation material of the present embodiment and the thermal insulation material of the first embodiment is that the thermal insulation layer is a single layer and there is no radiation reflection layer. Here, the difference will be mainly described. FIG. 4 shows a cross-sectional view in a thickness direction of the thermal insulation material of the present embodiment. In FIG. 4, members corresponding to FIG. 1 are denoted by the same reference numerals.

As shown in FIG. 4, a thermal insulation material 40 includes a thermal insulation layer 41, a first base material 13, a second base material 14, a first functional layer 16, and a second functional layer 17. The first functional layer 16 and the second functional layer 17 are arranged so as to be bilaterally symmetrical with each other with the thermal insulation layer 41 interposed therebetween. The thermal insulation layer 41 has a rectangular sheet shape with a thickness of 2,000 μm. The thermal insulation layer 41 has the same configuration as those of the first thermal insulation layer 11 and the second thermal insulation layer 12 of the first embodiment and contains a silica aerogel, silica particles, CMC, PEO, and glass fiber.

A method for producing the thermal insulation material 40 is as follows. First, a composition for a thermal insulation layer and a composition for a functional layer are prepared in the same manner as in the first embodiment. Next, the prepared composition for a functional layer is applied to one surface of the first base material 13 to form a coated film with a thickness of 2,000 μm. Subsequently, the second base material 14 is superposed thereon so as to cover the formed coated film. This is placed in a molding die and pressed while being heated to 150° C. Accordingly, the coated film is cured to form the thermal insulation layer 41. In addition, the superposed part of the first base material 13 and the second base material 14 is fused around the thermal insulation layer 41. Then, the prepared composition for a functional layer is applied to the other surface (outer surface) of the first base material 13 and the other surface (outer surface) of the second base material 14 and dried at a temperature of about 100° C. to form the first functional layer 16 and the second functional layer 17.

Regarding the portions having the common configuration, the thermal insulation material 40 of the present embodiment has the same effect as the thermal insulation material 10 of the first embodiment. Since no radiation reflection layer is placed in the thermal insulation material 40, the thermal insulation layer 41 can be made to be a single layer, which facilitates production and reduces costs.

Other Modes

The four embodiments of the thermal insulation materials of the present disclosure have been described above. However, the embodiments are not limited to the above-described modes. The embodiments can also be implemented in various modified modes and improved modes that can be made by those skilled in the art.

[Configurations of Thermal Insulation Materials]

Other configurations of the insulation materials of the present disclosure are particularly limited as long as these include a thermal insulation layer and a pair of functional layers arranged on both sides of the thermal insulation layers in the thickness direction (1) Thermal Insulation Layer The thermal insulation layer may be a single layer or two or more layers. In a case of two or more layers, other layers may be interposed between the thermal insulation layers. The total thickness of the thermal insulation layers may be appropriately determined according to the application. From the viewpoint of thermal insulation, the thickness of each thermal insulation layer is desirably 100 μm or more, 300 μm or more, or 500 μm or more. Too thick thermal insulation layers not only increase costs but also decrease the strength and become brittle. For this reason, the thickness of each thermal insulation desirably 5,000 μm or less, 3,000 μm or less, or 2,000 μm or less. The thermal insulation layers have a porous structure.

The porous structure has a skeleton that is composed of a plurality particles connected with each other and has pores inside. It is desirable that the diameter of the particles (primary particles) forming a skeleton be about 2 to 5 nm and the size of the pores formed between skeletons be about 10 to 50 nm. Most of the pores are so-called mesopores of 50 nm or less. Since the mesopores are smaller than mean free path of air, these restrict air convection and inhibit heat transfer. The shape of the porous structure is not particularly limited and may be a spherical shape, a heteromorphic block shape, and a chamfered shape or a spherical shape is desirable. In this case, since the dispersibility in a liquid is improved, preparation of a composition (composition for a thermal insulation layer) for producing a thermal insulation layer is facilitated. In addition, it is possible to increase the filling amount by reducing voids between porous structures, thereby enhancing the thermal insulation. The porous structures may be used as they are manufactured or may be used after being further pulverized. For the pulverization treatment, a pulverization device such as a jet mill or a spheroidization device may be used, for example. Through the pulverization treatment, corners of particles are rounded off and the particles have a rounded shape. Accordingly, the particles are likely to be bound to each other and the porous structures are less likely to fall off. In addition, the surface of the thermal insulation layer becomes smooth and cracks are less likely to occur.

In a case where the maximum lengths of porous structures are defined as particle diameters, the average particle diameter of the porous structures is desirably about 1 to 200 μm. The larger the particle diameters of the porous structures, the smaller the surface area and the larger the pore volume. Therefore, the effect of enhancing the thermal insulation is increased. For example, porous structures having an average particle diameter of 10 μm or more are suitable. On the other hand, in consideration of the stability of a composition for a thermal insulation layer or ease of application, porous structures having an average particle diameter of 100 μm or less are suitable. In addition, when two or more types with different particle diameters are used in combination, porous structures with small diameters enter gaps between porous structures with large diameters, so the filling amount can be increased and the effect of enhancing the thermal insulation is increased.

The porous structures have a hydrophobic portion on at least the surface of the exterior and the interior. If the surface has a hydrophobic portion, permeation of water or the like can be suppressed, so that the pore structure is maintained and the thermal insulation is less likely to be impaired. The function such as hydrophobicity can be imparted to the surfaces of the porous structures, for example, through a surface treatment with a silane coupling agent or the like. In addition, a hydrophobic treatment such as imparting a hydrophobic group may be carried out in the process of producing a porous structure.

The types of porous structures are not particularly limited. Examples of primary, particles include silica, alumina, zirconia, and titania. Among these, from the viewpoint of excellent chemical stability, primary particles are desirably silica, that is, a silica aerogel having a skeleton that is composed of a plurality of silica fine particles connected with each other. Silica aerogels are white and reflect infrared rays. Accordingly, when silica aerogels are used, a heat shielding effect can be imparted to thermal insulation layers.

A method for producing a silica aerogel is not particularly limited, and a drying step may be performed at normal pressure or under supercritical conditions. For example, if a hydrophobic treatment is performed before a drying step, it is unnecessary to perform drying under supercritical conditions, that is, the drying may be performed at normal pressure, thereby facilitating production at low cost. Due to the difference in drying method when producing aerogels, those dried at normal pressure may be called "xerogels," and those dried under supercritical conditions may be called "aerogels." However, in the present specification, both of them are collectively called "aerogels."

The content of porous structures in a thermal insulation layer may be appropriately determined in consideration of thermal insulation, mechanical strength, and the like. For example, from the viewpoint of reducing thermal conductivity (increasing thermal insulation), the content of porous structures is desirably 40 mass % or higher with respect to the total mass of a thermal insulation layer as 100 mass %. 50 mass % or higher or 60 mass % or higher is more suitable. On the other hand, when the number of porous structures increases, there is a concern that the porous structures will be likely to fall off. For this reason, the content of porous structures is desirably 75 mass % or lower with respect to the total mass of a thermal insulation layer as 100 mass %. 70 mass % or lower is more suitable.

The thermal insulation layer may contain a binder that binds components such as porous structures from the viewpoints that, for example, self-supportability can be ensured, that is, the thermal insulation layer can support its own weight, and the thermal insulation layer can be independently handled. However, if there is a binder on the surfaces or the gaps of components such as porous structures, there is a concern that a heat transfer path will be formed through the binder. Accordingly, from the viewpoint of suppressing the formation of a heat transfer path and realizing high thermal insulation in a high-temperature atmosphere, it is desirable that a thermal insulation layer do not contain a binder.

In a case where a thermal insulation layer contains a binder, a binder (aqueous binder) using water (including pure water, tap water, and the like) as a solvent is preferably used as a binder from the viewpoint of facilitating preparation of a composition for a thermal insulation layer. The component of the binder may be an organic material or inorganic material. From the viewpoint of reducing decomposition and deterioration of organic components when used in a high-temperature atmosphere and suppressing the occurrence of cracks and the like, it is desirable to use an inorganic binder whose component is an inorganic material. Examples of inorganic materials include metal oxides such as silica, titania, zinc oxide, and zirconia, as well as water glass sodium silicate), cement, gypsum, magnesium silicate, quicklime, and slaked lime. Among these, a binder containing silica is suitable because it is likely to be compatible with a porous structure, inexpensive, and readily available. In addition, magnesium silicate, gypsum, and cement which are hydraulic materials are also suitable because these are inexpensive and readily available, and a high-strength thermal insulation layer can be formed by forming a binder while filling gaps between porous structures while reacting with water which is a solvent.

In a case where an inorganic material is nanoparticles (nanometer-order particles), it is possible to improve disadvantages of hardness and brittleness caused by incorporating an inorganic material in a thermal insulation layer. A sodium silicate solution, colloidal silica, and the like in which water is used as a dispersion medium may be used as a binder having silica nanoparticles. An aqueous dispersion of titania may be used as a binder having titania nanoparticles.

There is a water-soluble binder and an emulsion-like binder as an organic binder whose component is an organic material. Among these, an emulsion-like binder (aqueous emulsion binder) is suitable. An aqueous emulsion binder is emulsified by introduction of a surfactant or a hydrophilic group. According to the aqueous emulsion binder, it is thought that a surfactant or a hydrophilic group volatilizes during drying, which reduces hydrophilicity and makes it difficult to dissolve in water, and therefore, stickiness is less likely to occur after curing a composition for a thermal insulation layer. The emulsification method may be a forced emulsification type in which a surfactant is used as an emulsifier or a self-emulsification type in which a hydrophilic group is introduced.

The organic material may be a resin or rubber. From the viewpoints of high adhesiveness to a porous structure and making a thermal insulation layer flexible to prevent cracks from forming, the glass transition temperature (Tg) of a binder is desirably −5° C. or lower and more desirably −20° C. or lower. For example, in a case of an aqueous emulsion binder, it may be a resin emulsion or a rubber emulsion. Examples of resins include an acrylic resin, a urethane resin, and a mixture of an acrylic resin and a urethane resin. Examples of rubber include styrene butadiene rubber (SBR), nitrile rubber, silicone rubber, urethane rubber, and acrylic rubber From the viewpoint of making a thermal insulation layer flexible, a urethane resin, SBR, and the like are suitable. From the viewpoint of enhancing the strength of a binder portion to enhance the strength of a thermal insulation layer, a cross-linking agent or the like may be used in combination to cross-link a binder component.

A thermal insulation layer may contain other components such as infrared shielding particles, a cross-linking agent, a thickener, a reinforcing fiber, and a flame retardant in addition to a porous structure and a binder. A porous structure having a hydrophobic portion in the exterior or the interior is less likely to be compatible with water. In particular, since a silica aerogel has a low specific gravity, it is likely to float on water. For this reason, it is difficult to disperse a silica aerogel in a liquid-like (including slurry-like) composition for a thermal insulation layer in which water is used as a solvent, and it takes time to carry out the dispersion step. For example, if a thickener is incorporated, the viscosity of a composition for a thermal insulation layer is improved, the water suspensibility of a hydrophobic porous structure is improved, so that the porous structure is likely to be dispersed. Accordingly, it is possible to shorten the time required for dispersing the porous structure and to improve the productivity. In addition, since flexibility is imparted to a thermal insulation layer, the occurrence of cracks is also suppressed. As thickeners, polysaccharides such as carboxyethyl cellulose, carboxypropyl cellulose, hydroxyethyl cellulose, hydroxypropyl cellulose, xanthan gum, agarose, and carrageenan, and polyvinyl alcohol, glucomannan, and the like may be used in addition to CMC and PEO used in the above-described embodiment.

Infrared shielding particles block radiation heat from a heat source by absorbing heat from the heat source and releasing it again from the surface on the heat source side. Accordingly, if infrared shielding particles are incorporated, the thermal insulation is improved especially in a high-temperature atmosphere. Examples of infrared shielding particles include silicon carbide, kaolinite, montmorillonite, silicon nitride, mica, alumina, zirconia, aluminum nitride, titanium oxide, zirconium silicate, zinc oxide, titanium oxide, tungsten oxide, niobium oxide, indium tin oxide, cerium oxide, boron carbide, manganese oxide, tin oxide, bismuth oxide, iron oxide, magnesium oxide, and barium titanate.

When a reinforcing fiber is incorporated, it is physically intertwined around a porous structure, thereby improving the mechanical strength of a thermal insulation layer and suppressing falling off of the porous structure. The type of reinforcing fiber is not particularly limited but is suitably glass fiber and ceramic fibers such as alumina fiber in consideration of heat resistance and the like.

When a flame retardant is incorporated, flame retardancy can be imparted to a thermal insulation layer. Already well-known flame retardants based on halogen, phosphorus, metal hydroxide, and the like may be used. Considering environmental loads, a phosphorus-based flame retardant is desirable. Examples of phosphorus-based flame retardants include ammonium polyphosphate, red phosphorus, and phosphoric acid esters. Among these, a water-insoluble one is desirable because a flame retardant is less likely to flow out even if it comes into contact with water during use, and fir example, ammonium polyphosphate is suitable.

(2) Functional Layer

A pair of functional layers having the same properties as each other is arranged on both sides of a thermal insulation layer in the thickness direction. For example, in a case where thermal insulation layers consist of a laminate of two or more layers, a pair of functional layers may be arranged on both sides of the outermost thermal insulation layers. The functional layers may be a single layer or two or more layers, but are desirably a single layer from the viewpoints of thinning and costs. The functional layers are desirably in the mode of having a plurality of properties in a single layer. The pair of functional layers may have different layer configurations, such as a single layer or two layers, components, shapes, dimensions, and the like as long as the functional layers as a whole have the same properties as each other. In consideration of ease of imparting properties, ease of production, and the like, the pair of functional layers desirably has at least the same layer configuration and components. In the present specification, a mode in which two functional layers exhibiting the same function are arranged on both sides of thermal insulation layers is called "symmetrically" arranged.

The pair of functional layers has at least fire resistance and radiant heat dissipation properties. For example, in a case of applications such as battery packs, heat-not-burn tobacco, and a fireproof insulation sheet, the functional layers desirably have fire resistance. In the present specification, the expression "the functional layers have fire resistance" means that at least one of the following two conditions (i) and (ii) is satisfied.

(i) A sample of a functional layer meets either V-0, V-1, or V-2 criterion in the standard combustion test.

(ii) Holes are not formed in a case where a flame of 10±2 cm in length is emitted from a propane gas burner at 1000° C. and a thermal insulation material is kept at a position 5±1 cm away from the flame for 1 minute.

From the viewpoint of fire resistance, the functional layers desirably contain a high melting point material with a melting point of 500° C. or higher. Examples of high melting point materials include talc, kaolinite, montmorillonite, mica, silica, potassium titanate, titanium oxide, silicon nitride, alumina, aluminum nitride, silicon carbide, and zirconia. In addition, similarly to the thermal insulation layers, flame retardants based on halogen, phosphorus, metal hydroxide, and the like may be used.

For example, in a case of applications such as battery packs, heat-not-burn tobacco, and a fireproof insulation sheet, the thermal insulation in a high-temperature atmosphere is desirably improved, and in this case, the functional layers desirably have radiant heat dissipation properties. In the present specification, the expression "the functional layers have radiant heat dissipation properties" means that the functional layers have a surface emissivity of 0.6 or higher. The emissivity may be measured with a well-known measurement device (for example, an "emissivity meter TSS-5X" manufactured by Japan Sensor Corporation).

From the viewpoint of radiant heat dissipation properties, the functional layers desirably, contain a high emissivity material with an emissivity of 0.6 or higher. Examples of high emissivity materials include mica, zirconia, alumina, aluminum nitride, silicon nitride, kaolinite, montmorillonite, and silicon carbide.

Examples of suitable properties of the functional layers include electrical insulation properties in addition to fire resistance and radiant heat dissipation properties. For example, in a case of applications such as electronic devices and battery packs, the functional layers desirably have electrical insulation properties. In the present specification, the expression "the functional layers have electrical insulation properties" means that the functional layers have an electrical resistance in the thickness direction of $1 \times 10^6$ Ω·cm or higher. The electrical resistance may be measured with a well-known measurement device (for example, an "insulation resistor 6517B" manufactured by Keithley Instruments, applied voltage of 100 V).

From the viewpoint of electrical insulation properties, the functional layers desirably contain an electrical insulation material with a volume resistivity of $1 \times 10^6$ Ω·cm or higher. Examples of electrical insulation materials include silicon carbide, titanium oxide, zirconia, kaolinite, mica, talc, silicon nitride, alumina, aluminum nitride, potassium titanate, and silica.

In addition, a relatively low thermal conductivity of the functional layers is effective in improving the thermal insulation. In this case, the functional layers desirably have a thermal conductivity of 2.5 W/m·K or lower. The thermal conductivity may be measured with a well-known measurement device (for example, a thermal conductivity checker "Quick Lambda HC-10" manufactured by EKO Instruments Co., Ltd.). From the viewpoint of reducing the thermal conductivity of the functional layers, the functional layers desirably contain talc, montmorillonite, silica, mica, kaolinite, and the like with a thermal conductivity of 2.5 W/m·K or lower. In many cases, the thermal conductivity of the functional layers is higher than that of the thermal insulation layers. For this reason, from the viewpoint of suppressing heat conduction, it is desirable that the thickness of the functional layers be relatively small, for example, 200 μm or less is preferable.

In summary, from the viewpoints of fire resistance and electrical insulation properties, the functional layers desirably contain mica, kaolinite, silica, talc, zirconia, and titanium oxide, and in further consideration of radiant heat dissipation properties, the functional layers desirably, contain mica, kaolinite, and zirconia. In addition, the functional layers may contain other components, for example, a binder that binds constituent materials. The functional layers can be arranged not only on both sides of the thermal insulation layers in the thickness direction but also on end surfaces of the thermal insulation layers or the like. For example, if the entire outer side of the thermal insulation material is coated with the functional layers having fire resistance and the like, the effect of blocking heat and flame is further enhanced and the safety is further improved.

(3) Radiation Reflection Layer

As shown in the first to third embodiments above, the thermal insulation materials of the present disclosure may include a radiation reflection layer in addition to thermal insulation layers and a pair of functional layers. The radiation reflection layer plays a role of mainly reflecting heat released from a heat source. Accordingly, the thermal insulation of the thermal insulation materials is further improved. In order to exhibit the heat reflection function, the radiation reflection layer is desirably placed away from the heat source. The radiation reflection layer may be placed outside the thermal insulation layers, that is, on the heat source side than the thermal insulation layers. However, the thermal insulation effect is enhanced by suppressing heat transfer by conduction and convection in the thermal insulation layers to some extent and then reflecting the heat in the radiation reflection layer. For this reason, the thermal insulation layers are desirably interposed between the heat source and the radiation reflection layer. For example, it is desirable to divide the thermal insulation layers into or more layers and place the radiation reflection layer between them.

The radiation reflection layer may be formed using a material, such as a metal, having a low emissivity. For example, a mode of having a low emissivity material with an emissivity of 0.2 or less is desirable. Examples of low emissivity materials include aluminum, aluminum compounds, magnesium, magnesium compounds, silver, titanium, titanium compounds, silver, gold, and copper. The shape of the radiation reflection layer is not particularly limited and may, be foil, a film, a sheet, a plate, and the like. Examples of radiation reflection layers include metal foil, a metal vapor deposition film, a metal paste dry film obtained by drying a metal paste, and a metal plate. Among these, the metal vapor deposition film may be produced by vapor-depositing a metal on the surface of a resin film consisting of polyethylene terephthalate (PET), polyethylene naphthalate (PEN), polyimide, polyethylene (PE), and the like through vapor deposition or sputtering. The metal paste dry film may be produced by applying a metal filler dispersion such as an aluminum paste on a base material and drying it. From the viewpoints of handleability, strength, and the like, the thickness of the radiation reflection layer is desirably 10 μm or more and more desirably 20 μm or more. From the viewpoints of thinning, flexibility, and the like, the thickness of the radiation reflection layer is desirably 200 μm or less and more desirably 100 μm or less.

(4) Base Material

As shown in the first to fourth embodiments above, the thermal insulation materials of the present disclosure may include a base material for holding a thermal insulation layer or a functional layer. Two base materials are used in the first and fourth embodiments above, but the number, material, shape, and the like of base materials are not particularly limited. For example, a base material may be placed only on one side of a thermal insulation layer, or one sheet of a base material may be folded back so as to wrap a thermal insulation layer and the like to form a covering body.

Examples of materials for base materials include cloth, resins, and paper. Examples of fibers constituting cloth include glass fiber, rock wool, ceramic fiber, alumina fiber, silica fiber, carbon fiber, metal fiber, polyimide fiber, aramid fiber, and polyphenylene sulfide (PPS) fiber. As ceramic fiber, refractory ceramic fiber (RCF), polycrystalline alumina fiber (polycrystalline wool: PCW), and alkaline earth silicate (AES) fiber are known. Among these, AES fiber is safer because it has biosolubility. Examples of resins include polyethylene terephthalate (PET), polyimide, polyamide, and PPS. Examples of paper include pulp and a composite material of pulp and magnesium silicate. The shape of a base material is not particularly limited, and examples thereof include woven fabrics, non-woven fabrics, films, and sheets. The base material may consist of a single layer or may be a laminate in which two or more same or different materials are laminated.

For example, non-woven fabrics or fabrics (woven fabrics) such as glass cloth produced from inorganic fibers such as glass fiber or metal fiber or fireproof insulation paper produced as a composite material of pulp and magnesium silicate have a relatively low thermal conductivity and have a high shape retainability even in a high-temperature atmosphere. In addition, if a base material with high heat resistance is employed, it can be applied to applications that require high heat resistance. Therefore, the applications of the thermal insulation materials of the present disclosure are expanded. Furthermore, if a base material with fire resistance is employed, the safety is further improved. The base material with high heat resistance may be produced from glass fiber, rock wool, ceramic fiber, polyimide, PPS, and the like, and specific examples thereof include glass fiber non-woven fabric, glass cloth, aluminum glass cloth, AES wool paper, and polyimide fiber non-woven fabric.

(5) Others

The thermal insulation materials of the present disclosure may include an adhesive layer between layers to enhance the adhesive strength between the layers. For example, in the thermal insulation materials of the second and third embodiments above, adhesive layers may be interposed between the first and second thermal insulation layers and the radiation reflection layer. The adhesive layers may contain a flame retardant and the like in addition to the adhesive component.

[Method for Producing Thermal Insulation Material]

As shown in the first and fourth embodiments above, the thermal insulation materials of the present disclosure can be produced such that a composition for a thermal insulation layer is applied to one surface of a base material and dried to form a thermal insulation layer, and a composition for a functional layer is applied on the other surface of the base material and dried to form a functional layer. Alternatively, a base material on which a functional layer is formed in advance may be used. In addition, as shown in the second and third embodiments, a composition for a functional layer may be directly applied to the surface of the thermal insulation layer and dried to form a functional layer. For coating, brush-coating may be performed, or a coater such as a blade coater, a bar coater, a die coater, a comma coater (registered trademark), or a roll coater, or a spray may be used, for example. Alternatively, a thermal insulation layer may be immersed in a composition for a functional layer. Drying may be performed at a temperature of 80° C. to 150° C. for about several minutes to several tens of minutes.

EXAMPLES

Next, the present disclosure will be described in more detail with reference to examples.

<Production of Thermal Insulation Material Sample>

[Sample A-1]

A thermal insulation material sample having the configuration of the fourth embodiment was produced. The composition of a thermal insulation layer and a functional layer is shown in Table 1 described below. First, a silica aerogel, infrared shielding particles (SiC), a reinforcing fiber (glass fiber), and a thickener (PEO) were placed in a kneader "Trimix (registered trademark)" manufactured by INOUE MFG., INC.) and stirred and mixed for 1 minute. Water was added thereto while continuing to stir as it was so that the solid content became 40% to 50%. Stirring and mixing was then further performed for 15 minutes. Thereafter, stirring and mixing was additionally performed for 30 minutes while stopping the stirring every 2 minutes and scraping off materials adhering to the inner wall surface of the container, the surface of the blade, and the like with a spatula to produce a clay-like composition for a thermal insulation layer. Apart from this, water was added to a urethane resin emulsion, and mica and ammonium polyphosphate were added thereto and stirred to prepare a composition for a functional layer.

Next, the prepared composition for a thermal insulation layer was applied to the upper surface of a first base material (glass cloth, thickness of 100 μm) to form a coated film with a thickness of 2 mm, and then a second base material (glass cloth, thickness of 100 μm) was superposed on the coated film. This laminate was placed in a molding die and pressed while being heated to 150° C. to form a thermal insulation layer. Then, the prepared composition for a functional layer was applied to the outer surfaces of the first base material and the second base material and dried at a temperature of about 100° C. to form a first functional layer and a second functional layer. The first functional layer and the second functional layer have a thickness of 200 μm and have the same component and properties. In this manner, a thermal insulation material sample A-1 was obtained in which the first functional layer, the first base material, the thermal insulation layer, the second base material, and the second functional layer were laminated in the thickness direction.

[Sample A-2]

A thermal insulation material sample A-2 was produced in the same manner as the sample A-1 except that infrared shielding particles (SiC) were not incorporated into a thermal insulation layer and kaolinite was incorporated into a functional layer stead of mica.

[Samples B-1 and B-2]

For the thermal insulation material samples A-1 and A-2, thermal insulation material samples B-1 and B-2 which did not have a first functional layer and a second functional layer were respectively produced. The thermal insulation material samples B-1 and were obtained by laminating a first base material, a thermal insulation layer, and a second base material in the thickness direction.

TABLE 1

| Thermal insulation material sample No. | Thermal insulation property evaluation | Composition [mass %] | | | | | | | |
|---|---|---|---|---|---|---|---|---|---|
| | | Thermal insulation layer | | | | Functional layer | | | |
| | | Porous structure Silica aerogel | Infrared shielding particles SiC | Reinforcing fiber Glass fiber | Thickener PEO | Mica | Kaolinite | Flame retardant Ammonium polyphosphate | Binder Urethane resin |
| A-1 | ○ | 69 | 20 | 8 | 3 | 48 | — | 35 | 17 |
| A-2 | ○ | 87 | 0 | 10 | 3 | — | 48 | 35 | 17 |
| B-1 | ○ | 69 | 20 | 8 | 3 | — | | | |
| B-2 | × | 87 | 0 | 10 | 3 | — | | | |

<Evaluation of Thermal Insulation Material Sample>
[Thermal Insulation]
(1) Evaluation Method The thermal conductivities of the produced thermal insulation material samples were measured with "Probe PD-31" and "Quick Thermal Conductivity Meter QTM-500" manufactured by Kyoto Electronics Manufacturing Co., Ltd. First, upper and lower sides of the probe were sandwiched between two stacked thermal insulation material samples, a weight was placed thereon so that the thermal insulation material samples would not be crushed, and the probe and the samples were placed in a ceramic electric furnace ("ARF-30K" manufactured by Asahi Rika Seisakusho Co., Ltd.). Then, the temperature inside the furnace was set to 800° C.±10° C. with a temperature controller ("AGC-S" manufactured by the same company), and the thermal conductivity was measured after the elapse of 10 minutes when the temperature was stabilized.

(2) Evaluation Results

The evaluation results of the thermal insulation based on the measurement results of the thermal conductivity are summarized in Table 1 above. In the evaluation of heat insulation properties, it was determined to be acceptable (indicated by the mark ○ in the table) if the thermal conductivity was lower than 0.3 W/m·K and it was determined to be unacceptable (indicated by the mark x in the table) if the thermal conductivity is 0.3 W/m-K or higher.

As shown in Table 1, it was confirmed that the samples A-1 and A-2 all had a thermal conductivity lower than 0.3 W/m·K and had excellent thermal insulation even in a high-temperature atmosphere at 800° C. On the other hand, according to the sample B-2 having no functional layer, the thermal conductivity was 0.3 W/m·K or higher and desired thermal insulation could not be obtained in a high-temperature atmosphere. Although the sample B-1 also did not have a functional layer, the thermal insulation was improved. The reason for this is thought to be that the thermal insulation layer has infrared shielding particles, thereby exhibiting the effect of blocking radiation heat.

INDUSTRIAL APPLICABILITY

The thermal insulation materials of the present disclosure are suitable for use as a thermal insulation material for vehicles, a thermal insulation material for houses, a thermal insulation material for electronic devices, a thermal insulation material for thermal insulation containers. In particular, it is suitable for use in battery packs, heat-not-burn tobacco, fireproof insulation sheets, and the like which require fire resistance or thermal insulation in a high-temperature atmosphere.

The invention claimed is:

1. A thermal insulation material comprising:
thermal insulation layers comprising a porous structure having a skeleton that is composed of a plurality of particles connected with each other, while having pores inside and hydrophobic portions at least on a surface among the surface and the inside, and a thickener, wherein the thickener comprises at least one of sodium carboxymethyl cellulose and polyethylene oxide; and
a pair of functional layers arranged on both sides of the thermal insulation layers in the thickness direction,
wherein the pair of functional layers has the same properties as each other, and has a thickness of 2,000 μm or less, and include fire resistance and radiant heat dissipation properties, and
the pair of functional layers has an emissivity of 0.6 or higher, has a melting point of 500° C. or higher, has a volume resistivity of $1 \times 10^6$ Ω·cm or higher, and has a thermal conductivity of 2.5 W/m·K or less.

2. The thermal insulation material according to claim 1, wherein the pair of functional layers has electrical insulation properties.

3. The thermal insulation material according to claim 1, wherein the pair of functional layers contains at least one selected from mica, kaolinite, silica, talc, zirconia, and titanium oxide.

4. The thermal insulation material according to claim 1, wherein the thermal insulation layers include a first thermal insulation layer and a second thermal insulation layer laminated in a thickness direction,
wherein the thermal insulation material includes a radiation reflection layer placed between the first thermal insulation layer and the second thermal insulation layer, and
wherein the pair of functional layers is arranged on a side of the first thermal insulation layer opposite to the radiation reflection layer and on a side of the second thermal insulation layer opposite to the radiation reflection layer.

5. The thermal insulation material according to claim 4, wherein the radiation reflection layer contains a low emissivity material with an emissivity of 0.2 or lower.

6. The thermal insulation material according to claim 4, wherein the radiation reflection layer is a metal foil, a metal vapor deposition film, or a metal paste dry film.

7. The thermal insulation material according to claim 1, wherein the thermal insulation layer has a thickness of 100 μm to 5,000 μm.

8. The thermal insulation material according to claim 1, wherein the thermal insulation layers further comprise a reinforcing fiber.

9. The thermal insulation material according to claim 1, wherein the thermal insulation layers further comprise infrared shielding particles.

10. The thermal insulation material according to claim 1, wherein the porous structure is a silica aerogel having a skeleton that is composed of a plurality of silica fine particles connected with each other.

* * * * *